(12) United States Patent
Kreysing et al.

(10) Patent No.: US 11,803,046 B2
(45) Date of Patent: Oct. 31, 2023

(54) APPARATUS AND METHOD FOR SIMULTANEOUS IMAGING AND EXECUTION OF CONTACT-FREE DIRECTED HYDRODYNAMIC FLOW

(71) Applicant: Max-Planck-Gesellschaft zur Förderung der Wissenschaften E.V., Munich (DE)

(72) Inventors: Moritz Kreysing, Dresden (DE); Anatol Fritsch, Dresden (DE); Matthaeus Mittasch, Dresden (DE)

(73) Assignee: Max-Planck-Gesellschaft zur Foerderung der Wissenschaften E.V., Munich (DE)

( * ) Notice: Subject to any disclaimer, the term of this patent is extended or adjusted under 35 U.S.C. 154(b) by 577 days.

(21) Appl. No.: 16/766,456

(22) PCT Filed: Nov. 23, 2018

(86) PCT No.: PCT/EP2018/082441
§ 371 (c)(1),
(2) Date: May 22, 2020

(87) PCT Pub. No.: WO2019/101964
PCT Pub. Date: May 31, 2019

(65) Prior Publication Data
US 2020/0379235 A1    Dec. 3, 2020

(30) Foreign Application Priority Data
Nov. 24, 2017    (EP) .................................... 17203545

(51) Int. Cl.
*G02B 21/36*    (2006.01)
*G02B 21/02*    (2006.01)
(Continued)

(52) U.S. Cl.
CPC .......... *G02B 21/36* (2013.01); *B01L 3/50273* (2013.01); *G02B 21/0032* (2013.01);
(Continued)

(58) Field of Classification Search
None
See application file for complete search history.

(56) References Cited

U.S. PATENT DOCUMENTS

| | | |
|---|---|---|
| 2005/0247866 A1 | 11/2005 | Plewa et al. |
| 2010/0157086 A1 | 6/2010 | Segale et al. |

(Continued)

FOREIGN PATENT DOCUMENTS

| | | |
|---|---|---|
| JP | 2000249928 A | 9/2000 |
| JP | 2014168095 A | 9/2014 |

(Continued)

OTHER PUBLICATIONS

Kaiser, Peter, EP Application No. 17203545.3-1020, Examination Report, dated Mar. 24, 2022, 14 pages.
(Continued)

*Primary Examiner* — Derek S. Chapel
(74) *Attorney, Agent, or Firm* — LaBatt, LLC (57) ABSTRACT

An apparatus and method for simultaneous imaging and execution of contact-free directed hydrodynamic flow in a specimen. The apparatus includes a laser adapted to dynamically heat the specimen, a microscope with an objective adapted to image at least a part of the specimen and to guide a light beam of the laser into and/or onto the specimen to heat at least one specified location of the specimen, means for manipulating the specified location, and a sample chamber for the specimen that is accessible for imaging radiation and the light beam to allow simultaneous imaging and manipulation of the sample via the objective.

33 Claims, 3 Drawing Sheets

(51) Int. Cl.
  *G02B 21/08*    (2006.01)
  *G02B 21/28*    (2006.01)
  *G02B 21/30*    (2006.01)
  *G01N 21/64*    (2006.01)
  *B01L 3/00*    (2006.01)
  *G02B 21/00*    (2006.01)
  *G01N 15/00*    (2006.01)

(52) U.S. Cl.
  CPC ............. *G02B 21/02* (2013.01); *G02B 21/08* (2013.01); *G02B 21/28* (2013.01); *G02B 21/30* (2013.01); *B01L 3/5027* (2013.01); *B01L 2400/0463* (2013.01); *G01N 21/6458* (2013.01); *G01N 2015/0065* (2013.01)

(56) References Cited

U.S. PATENT DOCUMENTS

| | | | |
|---|---|---|---|
| 2010/0330578 A1* | 12/2010 | Duhr | C12Q 1/6813 422/82.08 |
| 2014/0302490 A1* | 10/2014 | Medoro | B01L 3/502715 435/5 |
| 2015/0109591 A1 | 4/2015 | Gellrich et al. | |
| 2016/0304940 A1 | 10/2016 | Segale et al. | |
| 2017/0017075 A1* | 1/2017 | Reddy | G02B 26/10 |
| 2017/0030921 A1 | 2/2017 | Duhr et al. | |

FOREIGN PATENT DOCUMENTS

| | | |
|---|---|---|
| WO | 2008061706 A1 | 5/2008 |
| WO | 2009098079 A1 | 8/2009 |
| WO | 2017184741 A1 | 10/2017 |

OTHER PUBLICATIONS

Chinese Application No. 201880075845.3, Office Action 2, dated Apr. 2, 2022, 10 pages, no English translation.
Chinese Application No. 201880075845.3, Office Action, dated Sep. 27, 2021, 10 pages, no English translation.
Office Action for Chinese Application No. 201880075845.3, dated Dec. 14, 2022, 19 pages, with English translation.
Lindner, International Application No. PCT/EP2018/082441, International Preliminary Report on Patentability, dated Jun. 4, 2020, 15 pages.
Kaiser, Peter, EP Application No. 17203545.3-1020, Search Report, dated May 28, 2018, 13 pages.
Weinert et al., "Optical fluid and biomolecule transport with thermal fields," Physical Chemistry Chemical Physics, vol. 13, No. 21, Jan. 31, 2011, pp. 9918-9928.
Thalheim et al., "Manipulating Single and Multiple Biomolecules with Dynamic Temperature Fields," Optics in the Life Sciences Congress, vol. 10180, Jan. 31, 2017, p. OtM3E.1 (3 pages).
Mittasch et al., "Non-invasive perturbations of intracellular flow reveal physical principles of cell organization," Nature Cell Biology, vol. 20, No. 3, Feb. 5, 2018, pp. 344-351.
Weinert et al., "Optically driven fluid flow along arbitrary microscale patterns using thermoviscous expansion," Journal of Applied Physics, vol. 104, 2008, pp. 104701-1 to 104701-10.
Richards, Joanna, International Search Report and Written Opinion for PCT Application No. PCT/EP2018/082441, dated Feb. 22, 2019, 23 pages.
Japanese Application No. 2020-528436, Office Action, dated Jul. 29, 2022, 12 pages, with English translation.
Anonymous: "Data Sheet UPLSAPO30XSIR UPLSAPO Series", Jul. 24, 2014 (Jul. 24, 2014), XP093022089, Retrieved from the Internet: URL:https://www.microdemo.com/site/assets/files/2386/uplsapo_30sxir_en.pdf, 2 pages.
Anonymous: "OLYMPUS press release: Three New Objective Lenses for Biological Microscopy", Jul. 1, 2014 (Jul. 1, 2014), XP093022082, Retrieved from the Internet: URL:https://www-olympus-co-jp.translate.goog/jp/news/2014b/nr140701uis2j.html?_x_tr_sl=auto&_x_tr_tl=en&_x_tr_hl=en&_x_tr_pto=wapp [retrieved on Feb. 8, 2023], 4 pages.
Office Action for European Application No. 18 807 331.6, dated Feb. 15, 2023, 10 pages.
Office Action for Japanese Application No. 2020-528436 with English translation, dated Feb. 15, 2023, 7 pages.
Office Action for Chinese Application No. 201880075845.3 with English translation, dated Jun. 29, 2023, 19 pages.
Office Action for Japanese Application No. 2020-528436 with English translation, dated Jul. 4, 2023, 7 pages.

* cited by examiner

APPARATUS AND METHOD FOR SIMULTANEOUS IMAGING AND EXECUTION OF CONTACT-FREE DIRECTED HYDRODYNAMIC FLOW

The present invention is directed to an apparatus for simultaneous imaging and execution of contact-free directed hydrodynamic flow in a specimen, a method for simultaneous imaging and execution of contact-free directed hydrodynamic flow in a specimen, a computer program product and a computer-readable storage medium.

From the Journal of Applied Physics 104, 104701 (2008) the defined control of fluid flow on a microscale is known, which is the basis for several applications in chemistry and biochemistry and plays an important role in downscaling bio-sensing applications. A miniaturization may shorten the time of the experiment, enhance the signal to noise ratio of detection and reduce the overall consumption of chemicals. In the past, several ways to remotely switch valves in micro manufactured channels for the control of fluid flow in channels have been explored. Optical methods have been investigated to move covered liquid droplets or to drive liquid flow by holographically induced vortex flows near trapped particles. Lithographic surface patterning is used to induce droplet movement by thermocapillary actuation or surface acoustic waves. It was proposed as a remote-optical driving with controlled paths in two-dimensions for liquids without surface patterning or the usage of special substrates.

In previous state of the art microfluidics, pressure is used to drive a flow along microscale channels. However, pressure control suffers from hysteresis effects and requires macroscale connections to outside pumps and controllers.

From WO 2008/061706 A1 a method and apparatus are known for a fast thermo-optical characterization of particles. In particular it relates to a method and a device to measure stability of biomolecules, the interaction of molecules and the determination of the length/size of individual particles beats or the determination of length/size.

The present invention confronts the task of provision of an apparatus, a method, a computer program product and a computer-readable storage medium allowing for controlled manipulation via induced light and simultaneous imaging of a specimen.

This task is solved according to the invention by an apparatus, a method, a computer program product and a computer-readable storage medium as described and claimed herein.

Preferred embodiments are provided with the dependent claims, the description and figures.

The apparatus according to the invention is provided with at least one light source, in particular a laser source, adapted to dynamically heat the interior and/or a surface of the specimen, a microscope with an objective adapted to image at least a part of the specimen and to guide, in particular focus, a light beam of the light source, in particular a laser beam, into and/or onto the specimen to heat at least one specified location of the specimen, means for manipulating the specified location, and a sample chamber for the specimen that is accessible for imaging radiation and the light beam to allow simultaneous imaging and manipulation of the sample via the objective.

The ability to remotely control matter with light has advantages. In many fields of physics and biology, optical control of matter is used due to its versatility and precision and has had a major impact on experimental methods. For example, optical traps allowed cooling and isolating single atoms in vacuum in a wide variety of geometries. Furthermore, optical tweezers have been employed to grab and move objects on the microscale under physiological conditions.

The light source is preferably an infrared light source, particularly an infrared laser, with a wavelength in the range of 700 nm and 1 mm, preferably in the range of 1000 nm and 0.1 mm, and more preferably in the range of 1300 nm and 0.05 mm. The light source is particularly designed such that it emits radiation in wavelength regions where the infrared absorption of water is most pronounced. Particularly advantageous is the application of electromagnetic radiation at 1455 nm for heating the fluid of a specimen since water has a local absorption maximum at that wavelength.

A preferred embodiment of the inventive apparatus is characterized in that there is a means for coupling in of the light beam into the optical path of the microscope. This means for coupling in can be realized e.g. by a dichroic beam splitter.

In principle, it is possible to arrange the means for manipulating the specified location anywhere in the beam path to the specimen. In a preferred embodiment, the means for coupling in of the light beam is arranged downstream of the means for manipulating the specified location. The term downstream is, in this context, to be understood in relation to the direction of propagation of the light beam. I.e., in this embodiment, the light beam passes the means for manipulating first and is then coupled into the microscopic beam path.

Thereby, the advantage is achieved that manipulation of the specimen, i.e. the generation of contact-free directed hydrodynamic flow in the specimen, can be carried out independently from the imaging of the sample. E.g., in a situation where a certain region of the specimen is imaged with the microscope this region can be subjected to predefined patterns of the light beam for generating a hydrodynamic flow and the patterns can be chosen entirely independent from the imaging with the microscope.

Imaging in the sense of the present invention may be understood as at least one technique for real-time analysis of the specimen such as e.g. fluorescent analysis. The imaging technique may be conducted while manipulation of the specimen is executed.

Contact-free in the sense of the present invention may particularly be any lack of mechanic interaction of the specimen with a solid, liquid or gaseous probe. Light is considered in this context under its electromagnetic wave properties. Thus, interaction between light and a specimen and the light induced hydrodynamic flow is regarded as contact-free interaction.

A contact-free interaction in the sense of the present description can also mean that no solid-state probe particles are used as probes for heating the specimen. The specimen can, for example, be free of solid-state particles serving as a probe for the specimen heating. More specifically, in a preferred variant of the inventive method, no particles, particularly no gold particles; are used for the heating of the specimen. The term probe particle in this context means entities with the size of a nanoparticle or bigger.

The directed hydrodynamic flow according to the present invention is particularly to be understood as the resulting shift of a liquid portion within the specimen as a result of the controlled interaction between the light source and the specimen. However, the movement speed of the hydrodynamic flow may be detected by a movement of a probe, dye or particle within the fluid. Thus, the flow speed of the probe, dye or particle observed may be slower than the actual flow of the fluid itself.

The specimen may be any sample containing at least one fluid portion that allows a directed hydrodynamic flow. Preferably the specimen is a defined sample of liquid between two surfaces with a defined height, e.g. between two specimen holders, or a single- or multicellular biological sample dead or alive with at least one fluid or fluid containing compartment. The directed hydrodynamic flow may be used to transport at least one particle, probe or entity such as a chemical, a dye or a biologically active material, within/through the specimen, in particular within/through the fluid of the specimen, from a 1st to at least a 2nd location, preferably along a trajectory.

Also, the hydrodynamic flow may be provided to bring at least two particles within a fluid at a predetermined location within the specimen together.

The objective may be e.g. a single lens or a standard microscope lens.

According to the invention the particle, probe or entity may be any object that is transportable by the directed hydrodynamic flow through a specimen. Transportability of the particle may particularly depend on the particle size and/or the elasticity of the medium especially in viscoelastic media. Therefore, the particle size and the strength and width of the flow may correspond to each other.

According to the present invention the specimen is dynamically heated by a light source. Thus, a directed flow within the specimen may be introduced by changing the heating location in the specimen dynamically, preferably constantly, consequently providing a changing heat pattern within the specimen with areas of expansion, preferably presently heated areas, and areas of different extent of contraction, preferably in areas which have been heated before at different points in time. Each heated area may also be a part of a trajectory along which the light beam is moved.

According to a preferred embodiment of the present invention the light beam is directed to the specimen and moved through the specimen along at least one trajectory whereby the movement of the light beam through the specimen can either be continuous (without lingering of the light beam at a certain position) or with interruptions during which the light beam dwells at a certain position in the specimen for a certain time before movement of the light beam through the specimen continues.

Also, interruptions may be in the form of reduced radiation intake or no radiation intake from the light source.

Preferably the laser trajectory can be chosen as such, that after one period of a, preferably complex, laser trajectory every point in the sample is heated equally. This results in a homogenous temperature distribution across the sample. By breaking the symmetry of the focal volume path through the specimen, it is still possible to generate complex localized flow trajectories (see FIG. 2).

Generally speaking the flow speed linearly depends on the derivation of viscosity with respect to temperature ($d_{vis}/d_T$)

It is pointed out, that the specimen has a certain volume which might be restricted e.g. by at least a cell wall, the specimen holder surfaces or any other boundary. The focal volume of a light beam that is directed to the specimen through an objective can be directed to a place within the specimen or on its surface. When, according to the invention, one of the two is described it is implied that the other one (surface or interior) is alternatively or additionally included.

The microscope according to the present invention may be any apparatus with an objective that enables manipulation and observation of the induced changes within the specimen, preferably simultaneously.

The specified location according to the present invention may be a trajectory along which the light beam is moved within/on the specimen. Furthermore, the specified location may be a heat pattern provided at least in a part of the specimen, wherein the heat pattern induces a directed hydrodynamic flow within the specimen due to spatio-temporal dynamics the directed motion of a heat spot.

The means for manipulating the specific location according to the present invention may be any equipment that allows a manipulation of a direction of propagation of the light beam within the specimen.

A preferred embodiment of the present invention is characterized in that a means for manipulation of a focal volume of the light beam, in particular a variable optical beam expander, is provided between the light source and the microscope in a collimated portion of a light beam path. The variable optical beam expander is designed to widen or narrow down the width of the light beam from the light source. The means for manipulation of a focal volume of the light beam may be a zoom or vario-optic.

Preferably a collimator is provided in the path of the light beam in front of the means for manipulation of a focal volume of the light beam. The narrower the light beam is packed by the variable optical beam expander the broader the focal volume of the light beam will be after passing through the objective. Thus, the size of the focal volume as well as the intensity of the radiation that hits the specimen can be adjusted according to the well-known equation:

$$x_{min} = \lambda/(n \cdot \varphi)$$

Wherein n is the refraction index of the objective, $\varphi$ is the angle of the cone of light that exits the lens, which depends on the width of the collimated light beam that enters the objective, $\lambda$ is the wavelength of the light beam and $x_{min}$ represents the resolution of the spot and thereby determines the focal volume. Since $\varphi$ rises with the diameter of the beam entering the objective, it can be seen that the smaller the diameter of the collimated light beam the bigger the focal volume. Consequently, the energy intake of the sample per area or volume unit in the specimen decreases with an increasing beam width of the collimated light beam that enters the objective.

A narrow light beam leads to a bigger focal volume behind the objective. Thus, energy intake is spread across a bigger surface area/volume in the specimen and therefore the heating effect per unit in the specimen is smaller than with a broader collimated light beam that hits the objective. Preferably the beam expander specifically allows to match the size of the beam to roughly the size of the compartment or cell of the specimen that should be manipulated. More preferably, the focal volume may be adjusted to half of the size of a nucleus in e.g. a cell that is manipulated.

According to an embodiment of the present invention the means for manipulating the specified location is a scanner, in particular an acousto-optical deflector or a galvanometric scanner, in particular a quasi-static galvanometric scanner. In principle, a resonant galvanometric scanner can be used. Furthermore, it is conceivable to use a spatial light modulator (SLM) for beam deflection or beam manipulation purposes, which may or may not be combined with mechanical means (i.e. a rotatable Dove prism) to rotate the resulting intensity profiles.

Preferably a polarising beam splitter and/or a lambda-half plate is used in connection with the acousto-optical deflector to select linear polarized light and to rotate the linear polarization state of the light beam to match the optical axis of the deflector.

Preferably a shutter means is provided and adapted to disrupt coupling in of the light beam into an optical path of the microscope. This may be required for quantitative fluorescent imaging at a defined temperature, hampered by temperature dependence of a fluorescent protein. The intake of the light beam into the specimen heats the specimen. Therefore, the temperature of the specimen in particular in a certain region/area may be changed from ambient temperature, leading to a change of fluorescent intensity. When the shutter means is closed irradiation of the specimen by the light source is interrupted and an image can be computed without temperature induced fluorescent intensity change.

However, by provision of an indicator such as a fluorescent system (e.g. Rhodamine B) and according to prior calibration via known temperature changes, local temperature distribution can be determined. The detectable fluorescent intensity of the indicator can thus be correlated to the temperature distribution within the sample, knowing the temperature dependence of the fluorescent system.

According to a preferred embodiment of the present invention the microscope is at least one of the following: a confocal microscope, a fluorescent laser-scanning microscope, a wide-field-light microscope, a 2-photon-fluorescent microscope, a light-sheet microscope, a structured illumination microscope and/or a TIRF (total internal reflection) microscope. The microscope may be adapted to provide at least one of the following: high sensitivity imaging, high resolution imaging, compatibility with confocal, spinning disc and 2-photon-fluorescent, high resolution manipulation due to small heat pattern in the sample, compatibility with Fluorescence Recovery after Photobleaching, i.e. FRAP, compatibility with interferometric approaches to generate heating patterns and/or STED (Stimulated Emission Depletion), SIM (Structured illumination microscopy), PALM (Photoactivated localization microscopy), STORM (stochastic optical reconstruction microscopy) Holographic imaging, phase-contrast, DIC (Differential interference contrast).

Preferably the objective is provided with a high numerical aperture of at least 0.5, preferably 0.95, more preferably 1.2 and most preferably 1.4.

According to an embodiment of the present invention, an air or immersion objective is used, for the latter preferably silicon oil or heavy water is provided between the objective and the sample. In general, immersion liquids that do not absorb at the used laser wavelength may be used. The immersion liquid may amplify the resolution by a factor equal to the refractive index of the liquid. The immersion liquid is preferably placed between the objective and the specimen holder to avoid additional phase changes between parts of the apparatus and air. The numerical aperture of the objective will generally be influenced by the immersion liquid. Immersion optics is preferentially used to make sure that the numerical aperture (NA) is high, such that imaging has high sensitivity.

A preferred embodiment of the inventive apparatus features that the sample chamber comprises at least one of the following, a specimen holder, preferably a cover slip with a first sample chamber confining surface, at least one spacer on the specimen holder providing a defined sample thickness and a cooling device with a second chamber confining surface, wherein the spacer is provided between the first and the second confining surfaces. Although it is called specimen holder such feature may also be provided on an upper side of the specimen depending on the setup of the apparatus. The spacer may be of any material which provides a defined height of the sample chamber. Alternatively, a non-sandwich like sample mounting (as described above) is provided which comprises at least one opened side. Therefor e.g. a covering specimen slide may be dispensable.

A defined height and therefore a defined volume of the sample chamber may be of significance with respect to the energy intake during heating of the specimen by the light beam. The cooling device may comprise a transparent material which enables passage of imaging radiation, heating light and/or light for bright- or dark-field illumination of the specimen.

Preferably, the specimen holder and/or the second chamber confining surface have a thickness of at least 30 µm. The thickness may be adapted and can reach values of 170 µm or higher.

Preferably, it is provided that the second chamber confining surface of the cooling device comprises a heat conductive, transparent material, preferably sapphire or diamond. The heat absorbed by the specimen can preferably be dissipated to keep a defined temperature regime within the specimen. In particular with living specimen, such as a single- or multi-cell organism, decomposition of the specimen may occur when certain temperature thresholds are exceeded. For example, nerve cells should be handled at about 36° C. However, when exceeding 41° C. the nerve cells lose their integrity. The cooling device is adapted to, preferably continuously, remove heat from the specimen and keep the temperature at a pre-set level.

In another aspect of the present invention the cooling device further comprises at least one cooling element, preferably a Peltier element, adapted to cool the heat conductive material. The cooling element is preferably provided to keep the temperature of the cooling device stable. Heat that is transferred from the specimen to the second chamber confining surface may be removed by an active cooling element.

Also, the cooling device may be connected to a common operator control such as the computer, thus enabling an adaption of the cooling intensity, preferably dependent on the intensity of the radiation of the light source. Dynamic cooling can be provided which reduces temperature deviation from a set point which is important e.g. for vertebrate cells. Preferably the deviation is 50% or less.

In a further aspect of the present invention the cooling device comprises a heat management system which is adapted to remove heat from the cooling element. The cooling element produces heat, particularly on the opposing surface to provide the abovementioned local cooling effect on the specimen containing surface, or the inverse. This thermal energy has to be removed in order to avoid a local hotspot at the cooling element. Therefore, the heat management system may be provided with at least one contact element made of heat conductive material which preferably contacts the cooling element at an opposite side compared to the cooling device.

Alternatively or additionally, water cooling of the heat management system and/or cooling fins/ribs for cooling the heat management system are provided.

Thus, preferably the cooling element is sandwiched between the cooling device and the heat management system. The heat management system may comprise a hollow entity through which a cooling liquid, e.g. water, may be provided in close proximity to the contact area with the cooling element. Most preferably, a hollow metal body may be contacted with the cooling element through which cooling water or a different cooling liquid is pumped to keep up a certain cooling effect of the heat management system on the cooling element.

In particular for observation of the specimen, a bright- or dark-field illumination is provided which supports a direct or indirect inspection of the manipulated specimen through the objective of the microscope. The specimen may be provided between the objective and the cooling device. The illumination means may be provided on the opposite side of the cooling device compared to the specimen. Therefore, it is preferred that the cooling device and the heat management system respectively are either transparent or have a gap or hole for the illumination radiation to reach the specimen and the objective respectively.

Preferably, the apparatus comprises a data processing equipment which is connected to the cooling device, the microscope and the light source, whereby a cooling intensity of the cooling device and an intensity of the light beam can be set in dependence of each other and/or in dependence of an imaging information of the irradiated specimen. For a reproducible manipulation of the specimen the irradiated light beam is preferably provided with an adjustable intensity, i.e. energy output. This output may be tailored to the properties of the specimen or the manipulation conducted.

Also, when moving the light beam along a trajectory at the specimen it might be desirable to provide an energy profile with changing energy intake into the specimen along the trajectory. To avoid overheating of the specimen and to keep the temperature within the specimen at a predetermined level and/or below a certain threshold the output power of the cooling device may be adjusted to the energy output of the light source.

The information gathered from imaging the specimen while executing a contact-free directed hydrodynamic flow in combination with information on the energy intake from the light beam and the cooling power from the cooling element enables light beam intensity depending observation and manipulation of the specimen.

Even more preferable the data processing equipment is further connected to the means for manipulating the specified location of the light beam so as to bring about a controlled movement of the light beam through the specimen. The controlled movement of the light beam through the specimen might be along a predetermined trajectory which has been set up before manipulation of the specimen. A computer might be provided as data processing equipment with at least one interface for entering data on the trajectory of the light beam through the specimen.

The input means may be numerical or graphical. According to one embodiment of the present invention the input means are a touchscreen showing at least a part of the specimen or a dummy representing a specimen where the trajectory of the light beam might be programmed, e.g. by marking the trajectory of the light beam and thus by marking the movement of the light beam through the specimen on the presented graphic.

According to a preferred embodiment of the present invention the means for manipulating the specified location has at least one spatial light modulator. Any means for variable modulation of the local amplitude of a projected laser pattern, in particular a spatial light modulator (SLM), might be used for provision of a heating pattern at the specimen. Preferably, a spatial light modulator can be located in an image plane or a pupil plane of the beam path.

A spatial light modulator can, e.g., be used to move the focal volume of the light beam in the direction of an optical axis, e.g. a z-coordinate within the specimen. In this description, the x- and y-coordinate are orthogonal to an image plane, the microscope and/or the specimen holder surface. With such a spatial light modulator or a device which manipulates the radiation of the light source accordingly, a 3-dimensional trajectory of the focal volume of the light beam may be provided at the specimen.

The heating pattern might be provided at the specimen by repeatedly scanning the light beam along the trajectory in and/or on the specimen. However, a heating pattern might also be provided by, preferably constant and/or dynamic, heating of areas of the specimen, preferably with a temperature profile between the areas, where other areas are less or not heated at all. This way of producing a heating pattern can be used alone or in combination with a scanning light beam.

Another way of producing a heating pattern may be understood as an at least partial local irradiation of a certain fluid containing area within the specimen. Within that fluid containing area different energy levels of irradiation may be provided and/or in different fluid containing areas the same or different energy levels of irradiation may be established.

By provision of the heating pattern within the specimen according to the above provided explanation, there are areas with no or less irradiation compared to other areas in the specimen. Due to this difference in irradiation and therefore different temperatures in different areas of the specimen a hydrodynamic flow is induced in particular by the differences in viscosity, density and expansion of the fluid due to heating.

The person skilled in the art understands that a first area that contains a fluid which is heated more intensive will expand more, exhibits lower density and lower viscosity than a second area that contains a fluid which is not heated or heated less than the first area. In case the at least two areas are in fluid communication at least a part of the liquid will be dynamically moved from the first to the second area.

For example, when the heat intake between the first and the second area is reversed such that the second area is more heated than the first area, also the flow of liquid is reversed. By dynamically changing the heat between the first and second location a back and forward transportation or shaking/oscillating of the fluid of the specimen may be provided. Specifically, by scanning multiple times uni-directionally and then reversing the uni-directional scan, oscillatory flows with a given frequency can be induced. These oscillatory flows can be used to probe the material state of visco-elastic matter such as the cytoplasm, without any sample modification required. The response of the material can be detected by particle tracking, specifically by means of Fourier analysis of the obtained particle trajectory (lock-in technique). In principle, it is possible to detect an oscillatory motion of a particle via a Fourier transform of signals that are obtained by video recording and computer tracking of a particle trajectory. This can be used to measure viscous and elastic material properties.

Furthermore, it is possible to induce a material deformation by multiple uni-directional scans, with simultaneous detection of the time-dependent deformation (creep deformation). Followed by detection of time-dependent relaxation without stimulus.

In this example, there is not necessarily a light beam that is moving but rather an irradiation field with locally different intensities and/or blind spots in which no heating or only a reduced heating is provided. Also, the first and/or second areas may change or alter their positions and/or sizes.

A further possibility for heating at least one area of the specimen according to the second alternative mentioned above might be a temporal modulation of the local amplitude of a projected light field, in particular a laser pattern, or interference of multiple, coherent light (laser) fields for example by overlapping (laser) light field with a relative frequency shift.

The constructive and destructive interferences with structured patterns may be directed to the objective. The destructive interferences lead to the blind spots without heating or reduced heating. The constructive interference provides for at least one area in the specimen that is heated by the light beam. The interference pattern may be modulated by changing the relative phase of the individual light beams over time, i.e. by slightly mismatching the frequencies of two coherent laser beams.

For the creation of a suited interference pattern for example a phase mask or spatial light modulator may be provided which provides structured illumination/irradiation of the specimen. Furthermore, the interference of pattern generated by a phase mask with a reference beam might be used to generate dynamic heat fields.

Another way how flows can be created in a liquid is a locally repeated heating in the vicinity of a heat sink. During heating and especially cooling phases the established temperature field will decay faster in regions closer to this heat sink, such that the dynamics of the center of the established temperature field does not stay constant over time and instead slightly moves throughout the heating/cooling cycle. This effective motion of the temperature field then in turn will induce flows inside the liquid.

According to the inventive method for simultaneous imaging and executing contactfree directed hydrodynamic flow in a specimen, at least one light source, in particular a laser, dynamically heats the interior and/or a surface of the specimen via a light beam, in particular via a laser beam, the beam of the at least one light source is directed to the specimen through an objective of a microscope, the light beam is variably guided, in particular focused, to specified locations of the specimen inducing a hydrodynamic flow in the specimen, and imaging the specimen via the same objective as used for introduction of the light beam.

According to one aspect of the present invention contact free induction of a hydrodynamic flow in a liquid of the specimen is conducted while observation of the manipulation is enabled and executed via the same objective. Preferably a microscope is provided for that task which provides irradiation of the specimen and analysis of emitted radiation by the specimen, preferably fluorescent radiation.

According to a preferred embodiment of the present invention the objective is simultaneously used for the imaging of the specimen and the heating of the specimen with the light beam. Thus, manipulation of the specimen may be observed/imaged in real-time.

Preferably, a focal volume of the light beam, in particular of the laser beam, is moved along a path at the specimen by means of an acousto-optical deflector, a galvanometric scanner, in particular a quasi-static galvanometric scanner. In principle, a resonant galvanometric scanner may also be used. These scanners are in particular provided for xy-scanning. The xy-plane is parallel to the surface of the specimen holder and the objective but orthogonal to the light beam path. In principle, a scan in z-direction is possible by means of a SLM or a movable lens in particular a motorized lens in particular arranged within the beam path of the light beam.

According to an aspect of the present invention a shutter means in the path of the light beam is closed so that a heating of the specimen is interrupted, and a hydrodynamic flow is observed, preferably by fluorescent imaging, at a well-defined temperature, generally below a heating temperature of the light beam. With the shutter means heating of the specimen may be interrupted to allow measurement of protein concentrations.

Due to the provided cooling means and the preferably small volume of the specimen the temperature of the specimen can be reduced very quickly to the temperature of the cooling device/cooling means. Consequently, when the shutter means is closed the temperature within the specimen is well-defined.

Preferably, the specified location is repeatedly moved along a path or specified trajectory by the light beam. The contact-free directed hydrodynamic flow might be induced by a single movement of the light beam along the predetermined trajectory. However, to keep the liquid within the specimen flowing, a repeated movement of the light beam along the predetermined trajectory is advantageous. This repeated delineation of the trajectory or path by the light beam brings about a pumping effect within the specimen.

According to a further aspect of the present invention the at least one light source heats at least one of the specimen, a heat conductive particle such as a gold particle, a dye and/or a heat absorbing layer, in particular a carbon layer, in or on the specimen. The light beam preferably has its focal volume within a liquid portion of the specimen. However defined heating along the trajectory within the specimen may also be provided by heating auxiliary or supplementary entities. For example, heat absorbing particles such as gold or light absorbing dyes within the specimen might be heated additionally or in lieu of the fluid itself.

Also, in case only a surface layer and/or a certain layer within the specimen should be heated and/or brought into motion, the heat absorbing layer such as a carbon layer can be provided on and/or within the specimen and may be heated to absorb the energy of the light beam. The absorbed energy is transferred to the surrounding fluid along the intake trajectory of the light beam on the absorbing layer.

A particularly preferred embodiment of the inventive method is characterized in that the specimen's response to a flow driving stimulus is recorded. The flow driving stimulus can be a single, repeated, or periodic or sweeping stimulus. The recording of the specimen's response can serve the purpose of inferring material properties of the sample and/or phenomenological response coefficients that could aid a classification of the sample.

In the case where the flow driving stimulus is a periodic stimulus, it is preferred that microscopic images are taken at points in time with a predefined phase-relation, e.g. a constant phase relation, to the periodic stimulus. This has the advantage that the microscopic data can more readily be evaluated.

In a particularly preferred embodiment of the inventive method a particle tracking is performed by tracking of a fiducial marker, in particular followed by Fourier analysis of the trajectory of the fiducial marker. The term particle in this context is to be understood as a part of a, in particular biological, specimen. E.g., the movement of components of cells can be tracked with the inventive method.

As a fiducial marker a fluorescent protein complex, e.g. a µNS tracer particle or other cellular organelles like small granules, is used. The basic requirement for an entity to qualify as a possible fiducial marker is that it can be detected with standard microscopy techniques, particularly but not necessarily, with fluorescence microscopy.

The invention has many useful applications with regard to the alignment and manipulation of particles.

More specifically, the positioning of particles might be carried out with a precision higher than the typical size of the hydrodynamic flow field. This is most easily achieved in the case of a single particle but might also a be achieved in the case of multiple particles. By hydrodynamic flow field, or short flow field, we mean a vector field indicating the direction and magnitude of the hydrodynamic flow within the space of the specimen. More specifically, the term flow field denotes a hydrodynamic flow field which is brought about fully or at least partially by dynamically heating the interior and/or a surface of the specimen, as described above, over a restricted and predefined period of time.

For example, the positioning of multiple particles might be achieved by the application of a series of hydrodynamic flows fields that are chosen sequentially according to the flow-induced or spontaneous repositioning of particles. That is, a first flow field might be applied to for a finite period of time, such that particles are moved for some distance, followed by a second different flow field, followed by a third flow field, and so on, until particles have moved sufficiently close to their intended destinations, and/or into the desired relative spatial configuration or spacing.

A preferred alternative of the inventive method is therefore characterized in that the specimen is subjected to a series of flow fields, in particular such that one or multiple particles within the specimen are brought to specific destinations.

It might, in particular, be desirable to read out the relative change of particle position after the application of a flow field. Correspondingly, further variants of the invention are characterized in that a relative change of a particle position or of particle positions is determined after each application of a flow field.

Preferably, a relative change of a particle position or of particle positions can be used for the determination of a suitable further flow field to be applied subsequently. The information of the particle locations and/or mobility is used to predict, determine or compute suitable further flow field.

Alternatively, it might be desirable to apply flow fields such that other measures of particle position than the precise location is altered. Preferably, flow fields are applied such that at least the density, the spacing, and/or the clustering of particles in the specimen is changed.

Furthermore, flow fields can be applied such that at least one particle is kept at a predefined position in the specimen. This might be useful in situations where it is desired to continuously correct particle positions to counteract fluctuations of particle positions that may arise from diffusive motion and/or other source of motion in the surrounding of the particle, such as for example sample but not limited to drift, flows arising from capillary forces, and/or biological activity.

In a further preferred variant of the inventive method flow fields are applied such that for partially or fully positioned particles a spatial destination is change continuously or in discrete time steps. This is useful in situations where it is desired to change the destination of partially of fully positioned particles in discrete time steps or continuously, such that particle driven by the flow fields move along paths that connect these temporally changing destinations.

Additionally or alternatively, the flow fields can be computed and applied to move a particle along a desired path or a plurality of particles along desired paths.

Furthermore, according to the invention a computer program product is provided comprising instructions which, when the program is executed by a computer, causes the computer to carry out a method with the steps of controlling the means for manipulating a specified location of the specimen to be heated according to a predefined trajectory of the specified location, receiving a temperature readout on the cooling device, receiving imaging data from the microscope, receiving power output data from the light source, controlling a cooling intensity of the cooling device and an intensity of the light beam in dependence of each other and/or in dependence of an imaging information of the irradiated specimen.

Also, a computer-readable storage medium is provided comprising instructions which, when executed by a computer, causes the computer to carry out the method with the steps of controlling the means for manipulating a specified location of the specimen to be heated according to a predefined trajectory of the specified location, receiving a temperature readout on the cooling device, receiving imaging data from the microscope, receiving power output data from the light source, controlling a cooling intensity of the cooling device and an intensity of the light beam in dependence of each other and/or in dependence of an imaging information of the irradiated specimen.

In the following the invention is further explained by means of the provided drawing.

Figure 1:
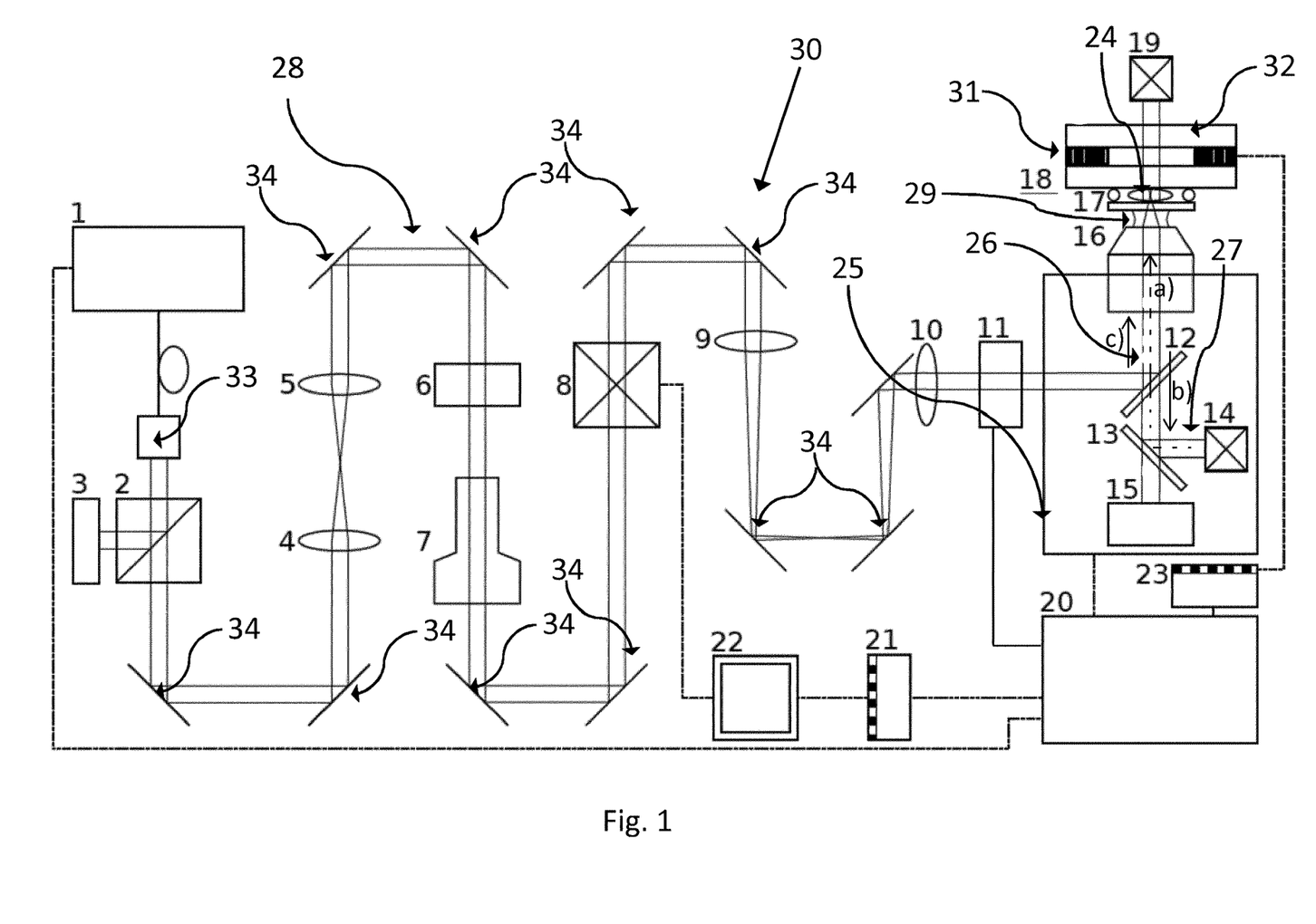
FIG. 1: A schematic sketch of the inventive apparatus according to a preferred embodiment.

FIG. 1 shows a preferred embodiment according to the present invention with a setup to provide for coherent light radiation, preferably laser light 26, 28 and a microscope 25 via which manipulation of the specimen 24 may be observed. The person skilled in the art understands that the particular setup of this embodiment is only explanatory and may be adapted according to the experiment conducted.

Manipulation of the Light Beam

The apparatus 30 according to the preferred embodiment comprises a light source 1 which is preferably a laser light source. Between the light source and the microscope 25 several fixtures in particular with the reference signs 2 to 11, 33 and 34 may be provided. The fixtures with the mentioned reference signs may be designed to provide for coherent, collimated radiation with a defined beam diameter. Any additional, supplementary or supersede installation for the same means may be provided.

The light beam between the light source 1 and at the shutter means 11 is referred to as light beam 28. The same light beam but within the microscope is referred to as light beam 26.

As a first step the light beam 28 may be collected from the exit of an optical fibre by the collimator 33 for collimating the radiation of the light source 1. Following the collimator 33 a polarizing beam splitter cube 2 may be provided to select for linear polarized light. The share of the light radiation which is not passed through the polarizing beam splitter cube 2 may be directed to a beam-dump 3 to safely block undesired light which could also be a photo-diode to measure the real output power of the light source 1.

Furthermore, a telescope with at least a first lens 4 and a second lens 5 may be provided as a pre-adjustment for a scanner 8 to eliminate divergences caused by the collimator 33 of the light source 1. Furthermore, a lambda-half plate 6 may be used to rotate the linear polarization state of the light beam to match the optical axis of the scanner 8. Furthermore, a variable optical beam expander 7 (zoom optics, vario optics) may be provided upstream of scanner 8.

The expander 7 is designed to manipulate the beam diameter without changing the size of the scan pattern within the specimen 24 provided by the scanner 8. The resolution of scan patterns can be matched to the size of the sample i.e. small flow fields and subcellular compartments and on larger scales can be generated without changing imaging objective. The objective 16 is adapted to image and/or manipulate at least a part of the specimen 24.

The scanner 8 might be an acousto-optical deflector (AOD), a galvanometric scanner, in particular a quasi-static galvanometric scanner or an SLM. Its purpose (8) may be described as directing the light beam 26, 28 to different locations within the specimen 24 and thereby moving a focal volume of the light beam 26, 28 along a trajectory or path at the specimen 24. The scanner 8 is a well-known tool in manipulation of light, in particular laser light. The scanner 8 may be provided with at least one mirror or a light refracting entity which may provide an adjustable angle of reflection/refraction with respect to the light beam 28. Consequently, the light beam 28 may be dynamically guided by the scanner 8 along the trajectory at least along the x- and y-axis within the specimen 24. These axes are preferably orthogonal to the light beam 26. Preferably the scanner 8 is used to repeatedly irradiate a chosen trajectory at the specimen 24 to keep an initially induced flow up and running.

The repetition leads to a pumping effect that provides a flow, which may be maintained from hundreds of nanometers up to even over a longer distance of millimeters. When reaching the endpoint of the trajectory with the light beam 26 the scanner 8 jumps to the starting point of the trajectory. Preferably, the light source 1 does not need to be switched off.

In the direction of propagation of the light beam after or downstream of the scanner 8 a second telescope with at least a first lens 9 the second lens 10 may be provided. The second telescope might be provided to precisely translate the scanner-induced beam movement into the back focal plane of the microscope objective.

Also, mirrors 34 may be provided between each of the installations between reference sign 1 and 11 for redirecting the light beam 28.

Further in the direction of propagation of the light beam after the scanner 8, preferably after the second telescope, a shutter means 11 is provided and designed to decouple the light beam from the imaging optics. This might be required for quantitative (fluorescent) imaging. For example, when a fluorescent protein is provided as a dye for imaging the manipulation of the specimen 24 the emitting activity of the dye is temperature dependent. By closing the shutter means 11 the temperature may be adjusted to a precisely defined temperature which allows imaging of the specimen at a well-defined concentration and at a well-defined temperature of the dye/the fluid.

With beforehand imaging experiments the temperature dependence of the behaviour of the dye, in particular its emitting activity and/or absorption activity, may be analysed. Subsequently, when manipulating and imaging the specimen 24 in which the dye is provided simultaneously, the actual temperature of a certain area within the specimen 24 may be determined in real time owing to the imaging information on the dye.

Furthermore, after inducing a flow within the specimen 24 the shutter means 11 may be closed for interruption of light beam intake. Therefore, the specimen 24 cools down to a temperature that equals about the temperature that is provided by the cooling device 18.

Structure of the Microscope

Following the manipulation of the light beam by any of the means to 2 to 11, the microscope 25 is provided for both imaging and manipulation of the specimen 24. At least one element 12 is provided for coupling in of the light beam into the optical path a) of the microscope 25. Preferably, such element 12 is a dichroic mirror that preferably reflects the light beam but transmits in the visible wavelength regime used for fluorescent imaging. Thus, the light beam entering the microscope 25 might be redirected by the element 12 but the radiation that is needed for imaging the specimen passes through the element 12 to reach the objective 16 of the microscope 25.

The microscope 25 may be a standard microscope, with preferably any of at least one (fluorescent) filter cube 13 consisting of respective excitation, dichroic, and emission filters, a light source for imaging (e.g. a fluorescent light source or a bright field illumination) 14, a detector for imaging radiation 15, in particular a high-speed and high-sensitivity camera providing quantitative (fluorescent) imaging and a microscope objective 16. The imaging radiation source 14 and/or a detector for imaging radiation 15 (e.g. camera) may be provided within the microscope beam path a) and/or may be projected into the same, for example via the emission filter 13. FIG. 1 shows a beam path of imaging radiation 27 that is projected into the irradiation beam path a).

By the continuous arrows the direction of the detection beam path b) as well as the irradiation beam path c) is indicated along which the light beam is provided. The detection beam path b) starts at the specimen 24 and goes through the objective 16 to the detector 15 for imaging radiation. The irradiation beam path a) for imaging radiation starts at the source of imaging radiation 14 and goes through the objective 16 to the specimen 24.

The microscope objective 16 preferably comprises a high numerical aperture providing simultaneous high-resolution (fluorescent) imaging and precise light beam (e.g. infrared laser) scanning. Preferably heavy water or silicone oil is provided as an immersion liquid 29 for the respective objectives. Also, a high NA air objective may be used. The immersion liquid 29 is preferably placed between the sample chamber 17 and the objective 16. This eliminates additional phase transitions with a gaseous phase (air) which would lower resolution of the imaged specimen 24.

The specimen 24 may be provided within a sample chamber 17. The sample chamber 17 may be regarded as the place in which a defined volume for the specimen 24 is provided. The specimen 24 may be a single- or multicellular life form, a fluid with at least one particle within or any other liquid sample, cell lysates or embryonic extracts, viscous-elastic materials that are hydrodynamically or thermally movable. The sample chamber 17 may be provided with a first cover providing a first chamber confining surface that preferably comprises sapphire or diamond or any other high heat conducting and/or transparent material. Transparency may be provided at least for visible light and/or any other radiation used according to the invention for imaging, manipulation and/or backlight. Also, the first cover surface may be a standard microscope slip.

The sample chamber 17 is preferably restricted by a second chamber confining surface that may be part of the cooling device 18 or an open multi-well plate for highthroughput experiments. The second chamber confining surface preferably comprises sapphire or diamond or any other high heat conducting and transparent material. Alternatively, a glass surface like a coverslip/cover glass may also be provided as the second confining surface. Transparency may be provided at least for visible light and/or any other radiation used according to the invention for imaging, manipulation and/or backlight. Below the second chamber confining surface of the cooling device 18 a cooling element 31, preferably at least one Peltier element, may be provided. The person skilled in the art understands that every cooling element also outputs heat, particularly in the form of waste heat that needs to be dissipated. Therefore, a heat management system 32 may be provided that removes heat from the cooling element 31.

Preferably, the heat management system 32 comprises a metal or a different heat conducting surface wherein an exchanging cooling liquid, preferably water, may be provided as a heat dump. Also, passive cooling may be provided. Preferably behind the cooling device 18, a bright- or dark-field illumination 19 is provided for the specimen 24. The heat management system 32 is preferably provided with an opening or transparent layer to allow the bright- or dark-field illumination 19 to irradiate the specimen 24. Additionally or alternatively, the bright- or dark-field illumination 19 may be provided at the location of the imaging sensor 15 and vice versa according to FIG. 1.

Additionally, a computer 20 may be provided that is preferably connected to the light source 1, the scanner 8, the microscope 25, the imaging sensor 15, the shutter 11 and/or the cooling element 31. Between the computer and the cooling element 31 a proportional integral differential (PID) control 23 may be provided which preferably helps avoiding oscillations of the temperature of the cooling element 31 when readjustment of the cooling temperature is required. The installations 21 and 22 are preferably provided between the scanner 8 and the computer 20 and may comprise a PCI controller card 21 providing an analogue signal for the scanner control box 22 and the scanner control box 22 may include electronic oscillators and electronic amplifiers for operation of the scanner 8.

The computer 20 is preferably set-up with and according to a computer program product that provides a coordination of application of light radiation to the specimen 24 (light beam, laser beam), adjusted cooling by the cooling element 31 with respect to the power output of the light source 1, movement of the scanner 8 according to a predetermined trajectory so as a focal volume of the light beam 26 is provided with in the specimen 24 that moves along the predetermined trajectory and/or real-time imaging of the specimen 24, when the program is executed by a computer.

Thus, the imaging information at each point in time may be brought into context with the output power of the light source 1 and the actual point or area at the specimen 24 that is irradiated by the light beam 26 or the focal volume respectively at a more or less constant temperature since the change in output energy by the light source 1 may be compensated by additional cooling power of the cooling element 31.

Technique

The actual movement of the hydrodynamic flow may be observed by the movement of the particle that is carried with the flow of the fluid. The flow speed of the fluid according to the present invention may be the speed of travel of the particle within the flow. Preferably the direction of the flow is opposite to the trajectory of the light beam movement.

Furthermore, the flow may be observed by usage of a dye, whereby a temperature gradient and/or the concentration gradient may be recordable from the imaging detector 15 and therefore allows a determination of the flow speed of the dye representative for the flow of the liquid/fluid.

In case that only compartments of the specimen for example a surface area of the specimen is to be dynamically heated by the light source 1 without heating additional fluid above and/or below that compartment in an optical path direction, a particle or layer in that area of desired dynamical heating may be provided to absorb light of suitable wavelength and consequently be heated by the light beam or the focal volume respectively.

The wavelength and the particle/layer material may be chosen to absorb a wavelength that is preferably not absorbed by the fluid of the specimen. Such particle may be for example a gold particle that is irradiated and is therefore heated up by the light beam. The introduced energy is then transferred to the surrounding liquid which ultimately leads to the hydrodynamic flow in the liquid when particles along the trajectory are dynamically heated. The person skilled in the art understands that several of these particles need to be provided along a trajectory of hydrodynamic flow within the fluid or specimen 24. Additionally or in lieu of particles within the fluid, a layer may be provided on the specimen 24 or within the specimen 24 that is irradiated by the light beam and consequently heated.

The light beam is preferably moved along the trajectory heating a particular path. The liquid in close proximity below and/or above that layer absorbs the heat from the layer which yields a localized hydrodynamic flow in proximity to that layer. The layer might be a thin carbon layer or a comparable material that provides absorption of the light beam that is preferably an infrared laser but allows transmission of visible light so that fluorescent imaging of the specimen may be conducted. However, the light beam may comprise other non-infrared wavelengths as well.

Figure 2:
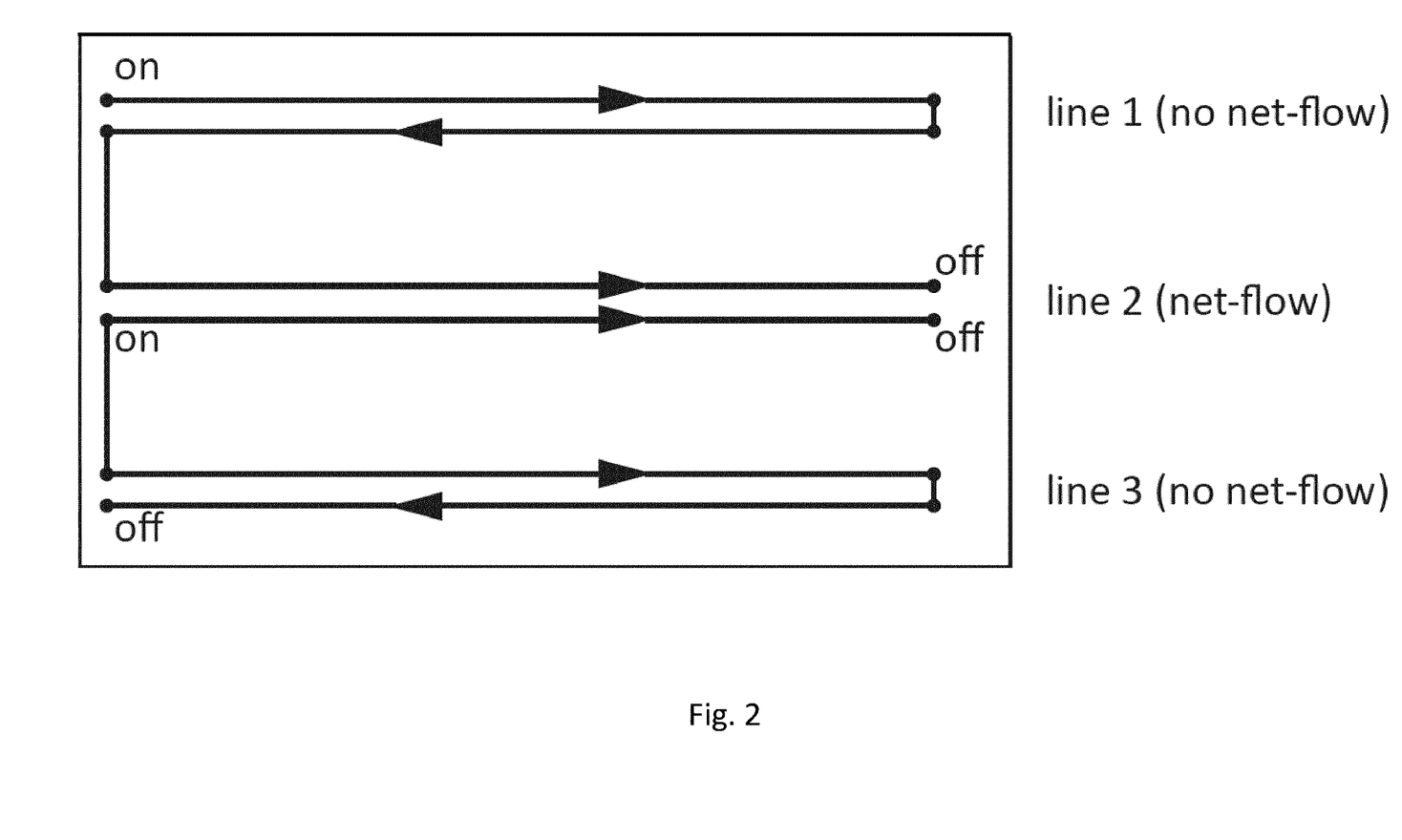
FIG. 2: An example of a time-average equally heated specimen, that experiences directed hydrodynamic flow.

The vertical and horizontal lines according to FIG. 2 depict trajectories along which a focal volume of a laser beam can been moved in a specimen. The lines according to FIG. 2 may be of a small distance such that the specimen is regarded as evenly heated. Along each line the focal volume is moved twice. The arrows on the lines indicate a direction of the focal volume movement.

In the lines 1 and 3 the movement is one from left to the right and from right to the left.

Consequently, the induced hydrodynamic flow in these lines is neutralized, in particular due to the almost simultaneous induced flow in two opposite directions. In line 2 the focal volume is moved twice from the left side to the right side (or the other way around), whereby the induced flow from both focal volume movement is in the same direction.

Consequently, a hydrodynamic flow is induced although the average temperature is about evenly distributed. The flow in line 2 is induced in the opposite direction as the movement direction of the focal volume.

Figure 3:
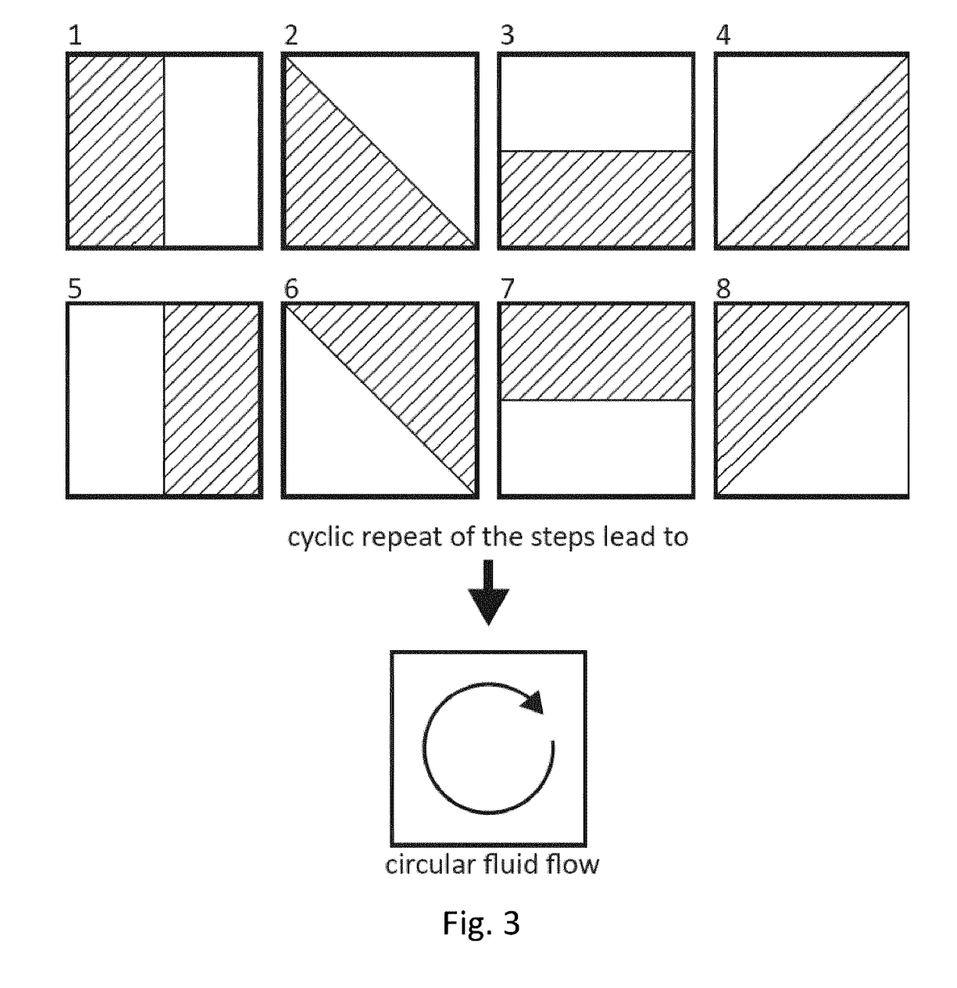
FIG. 3: An example how to induce a rotation as a directed hydrodynamic flow in a specimen.

The laser may also be moved through the specimen according to the scheme in FIG. 3.

The depicted squares 1 to 8 represent at least an excerpt of a specimen as defined according to the invention.

Each square 1 to 8 represents about the same area within the specimen at different points in time.

The eight squares represent eight different focal volume light beam patterns the specimen is exposed to one after another, preferably according to an ascending numbering.

The manipulated specimen can be smaller, bigger or equal in size compared to the squares.

By an according change in viscosity over time in that square due to the local change in temperature, a spinning movement of a fluid in the specimen may be generated.

Each dashed area within the squares stands for a heated area within the specimen. The area may comprise a number of heated locations that a discretely heated and/or a trajectory that is moved along to provide a heated area in time average. Preferably, each heated area within a particular square is induced into the specimen one after another however, faster than a change of the pattern from one square to another is provided. Consequently, in a time average, a heated area according to the dashed lines in each square is provided.

Preferably after one full cycle during which the pattern according to all eight squares has been introduced, each dashed area is equally heated.

The number of heated locations/trajectories or squares, i.e. parts of a cycle, can be adapted and be of any number bigger than or equal to 2.

The invention enables an active and probe-free micro-rheology based on oscillatory hydrodynamic flows. More specifically, the invention, in an effort to actively measure the rheological material properties of intracellular components such as the cytoplasm or chromatin of living cells, developed an active and probe-free micro-rheology.

For embodiments of the invention key ideas in this regard comprise inducing weak oscillatory hydrodynamic flow stimuli and simultaneously measuring the response of the material by tracking a cellular fiducial marker. A fiducial marker can be any expressed fluorescent protein complex i.e. µNS tracer particles or other cellular organelles like small granules that can be detected with standard microscopy techniques.

To induce the oscillatory hydrodynamic flows, flows can e.g. be applied in alternating, opposing directions for typically half periods of 80 ms, before reversing the flow (160 ms for a full period). This will lead to an effective oscillation frequency of the cellular material of 6.25 Hz. The technical details i.e. laser scan frequency and number of scans are by way of example described in Table 1. By changing the number of scans at a given laser scan frequency the oscillation frequency can be tuned over at least two orders of magnitude.

The response of the material to the induced oscillatory hydrodynamic flows can typically performed by tracking a fiducial marker followed by Fourier analysis of the particle trajectory. Here, it is preferable that each flow period was recorded with $2^n$ camera images. Typically, 8 images per period can be used and in total 128 periods per measurement. The details are shown in Table 1.

The technological advantage of the invention over existing micro-rheology techniques, such as magnetic tweezers or optical tweezers, is that the inventive apparatus and the inventive method do not require any sample modification or probe injection. This feature is particularly important for working in closed geometries such as in living embryos and cells that are often severely affected by the particle incorporation.

TABLE 1

| Possible settings for flow-driven micro-rheology | | | | | |
|---|---|---|---|---|---|
| Oscillation frequency (Hz) | Scan frequency (kHz) | Scans per half period | Camera frame rate (Hz) | Camera Exposure time (s) | Number of recorded frames |
| 0.5 | 2 | 2000 | 4 | 0.05 | 256 |
| 6.25 | 2 | 160 | 50 | 0.018 | 1024 |
| 50 | 2 | 20 | 400 | 0.0017 | 8196 |

The invention claimed is:

1. Apparatus for simultaneous imaging and execution of contact-free directed hydrodynamic flow in a specimen, the apparatus comprising:
   an infrared laser source adapted to dynamically heat at least one specified location of the specimen,
   a microscope having a light source which provides visible light and an objective adapted for fluorescence imaging of at least a part of the specimen and to guide or focus a light beam of the infrared laser source into and/or onto the specimen to heat the at least one specified location of the specimen to allow simultaneous imaging and manipulation of the sample via the objective,
   means for manipulating the specified location of the specimen which is to be heated,
   means for coupling in light from the infrared laser source into an optical path of the microscope is arranged downstream of the means for manipulating the specified location of the specimen, and
   a sample chamber for the specimen that is accessible for visible imaging radiation and the light beam to allow simultaneous imaging and manipulation of the sample via the objective,
   wherein the objective is an immersion objective, and wherein heavy water is located between the objective and the sample.

2. Apparatus according to claim 1, wherein a means for manipulation of a focal volume of the light beam, is provided between the infrared laser source and the microscope in a collimated portion of a light beam path.

3. Apparatus according to claim 1, wherein the means for manipulating the specified location is a scanner.

4. Apparatus according to claim 1, wherein a shutter means is provided and adapted to disrupt coupling of the light beam into an optical path of the microscope.

5. Apparatus according to claim 1, wherein the microscope is at least one of the following: a confocal microscope, a fluorescent laser-scanning microscope, a wide-field-light microscope or a 2-photon fluorescence microscope.

6. Apparatus according to claim 1, wherein the objective has a high numerical aperture of at least 0.5.

7. Apparatus according to claim 1, wherein the infrared laser source has a wavelength in a range of 1000 nanometers and 0.1 millimeters.

8. Apparatus according to claim 1, wherein the sample chamber comprises a specimen holder with a first sample chamber confining surface, at least one spacer on the specimen holder providing a defined sample thickness, and a cooling device with a second chamber confining surface, wherein the spacer is provided between the first and the second confining surfaces.

9. Apparatus according to claim 8, wherein the specimen holder and the second chamber confining surface have a thickness of at least 30 μm.

10. Apparatus according to claim 8, wherein the second chamber confining surface of the cooling device comprises a heat conductive, transparent material.

11. Apparatus according to claim 8, wherein the cooling device further comprises at least one cooling element adapted to cool the heat conductive material.

12. Apparatus according to claim 8, wherein the cooling device comprises a heat management system which is adapted to remove heat from the cooling element.

13. Apparatus according to claim 1, wherein the light source provides a bright or dark field illumination which supports a direct or indirect inspection of the manipulated specimen through the objective of the microscope.

14. Apparatus according to claim 1, wherein a data processing equipment is provided which is connected to the cooling device, the microscope, the shutter, and the light source, whereby a cooling intensity of the cooling device and an intensity of the light beam can be set in dependence of each other and in dependence of an imaging information of the irradiated specimen.

15. Apparatus according to claim 14, wherein the data processing equipment is further connected to the means for manipulating the specified location of the light beam so as to bring about a controlled movement of the light beam through the specimen.

16. Apparatus according to claim 1, wherein the means for manipulating the specified location has at least one spatial light modulator.

17. Apparatus according to claim 1, wherein the infrared laser source has a wavelength in the range of 700 nm and 1 mm.

18. Method for simultaneous imaging and executing contact-free directed hydrodynamic flow in a specimen, the method comprising:
fluorescence imaging the specimen via an objective of a microscope using visible light provided by a light source;
an infrared laser source dynamically heating at least one of an interior or a surface, of the specimen via a light beam;
inducing a hydrodynamic flow in the specimen through changing heat patterns with the specimen by manipulating a specified location of the specimen which is to be heated by variably guiding the light beam to specified locations of the specimen; and
coupling the light beam of the infrared laser source into an optical path of the microscope downstream of a means for manipulating the specified location of the specimen which is to be heated,
wherein the light beam is directed to the specimen through the objective of the microscope,
wherein the objective is an immersion objective, and
wherein heavy water is located between the objective and the sample as immersion fluid.

19. Method according to claim 18, wherein a trajectory of the specified location to be heated is chosen such that a symmetry of a focal volume path through the specimen is broken, and wherein every point in the sample is heated equally after one period of the trajectory.

20. Method according to claim 18, wherein a focal volume of the light beam is moved along a path at the specimen by means of an acousto-optical deflector or a galvanometer scanner.

21. Method according to claim 18, wherein a shutter means in the path of the light beam is closed so that a heating of the specimen is interrupted and a hydrodynamic flow is observed at a precise temperature.

22. Method according to claim 18, wherein the specified location is repeatedly moved along a path or trajectory by the light beam.

23. Method according to claim 18, wherein the infrared laser source heats at least one of the specimen, or a heat conductive particle in or on the specimen.

24. Method according to claim 18, wherein no solid-state probe particles are used as probes for heating the specimen.

25. Method according to claim 18, wherein the specimen's response to a flow driving stimulus is recorded.

26. Method according to claim 18, wherein a particle tracking is performed by tracking of a fiducial marker.

27. Method according to claim 26, wherein a fluorescent protein complex is used as the fiducial marker.

28. Method according to claim 18, wherein the specimen is subjected to a series of flow fields.

29. Method according to claim 18, wherein a relative change of a particle position or of particle positions is determined after each application of a flow field.

30. Method according to claim 18, wherein a relative change of a particle position or of particle positions is used for the determination of a suitable further flow field to be applied subsequently.

31. Method according to claim 18, Wherein flow fields are applied such that at least one of a density, spacing, or clustering of particles, in the specimen is changed.

32. Method according to claim 18, wherein flow fields are applied such that for partially or fully positioned particles spatial destinations are changed continuously or in discrete time steps.

33. Method according to claim 18, wherein flow fields are computed and applied to move at least one particle along a desired path.

* * * * *